(12) United States Patent
Suzuki

(10) Patent No.: US 9,509,907 B2
(45) Date of Patent: Nov. 29, 2016

(54) INFORMATION PROCESSING DEVICE, STORAGE MEDIUM HAVING MOVING IMAGE DATA STORED THEREON, INFORMATION PROCESSING SYSTEM, STORAGE MEDIUM HAVING MOVING IMAGE REPRODUCTION PROGRAM STORED THEREON, AND MOVING IMAGE REPRODUCTION METHOD

(71) Applicant: NINTENDO CO., LTD., Kyoto (JP)

(72) Inventor: Toshiaki Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/030,316

(22) Filed: Sep. 18, 2013

(65) Prior Publication Data

US 2014/0270693 A1  Sep. 18, 2014

(30) Foreign Application Priority Data

Mar. 18, 2013  (JP) ................................. 2013-055315

(51) Int. Cl.

| | |
|---|---|
| *H04N 5/775* | (2006.01) |
| *H04N 5/232* | (2006.01) |
| *H04N 9/79* | (2006.01) |
| *H04N 21/422* | (2011.01) |
| *H04N 21/4728* | (2011.01) |
| *H04N 21/488* | (2011.01) |
| *H04N 21/81* | (2011.01) |

(Continued)

(52) U.S. Cl.
CPC ........ *H04N 5/23238* (2013.01); *H04N 9/7921* (2013.01); *H04N 21/4222* (2013.01); *H04N 21/4728* (2013.01); *H04N 21/4882* (2013.01); *H04N 21/816* (2013.01); *H04N 5/76* (2013.01); *H04N 2005/4425* (2013.01)

(58) Field of Classification Search
CPC ..................... H04N 5/23238; H04N 5/23293; H04N 13/0011; H04N 5/232; H04N 5/2624; H04N 2005/4425; H04N 21/4882; H04N 9/7921
USPC .................... 386/230, 232, 362, 354; 348/36
See application file for complete search history.

(56) References Cited

U.S. PATENT DOCUMENTS

| | | | | |
|---|---|---|---|---|
| 5,138,460 A | * | 8/1992 | Egawa ................... | G03B 37/04 348/239 |
| 6,507,359 B1 | * | 1/2003 | Muramoto ............. | H04N 5/772 345/8 |
| 6,510,283 B1 | * | 1/2003 | Yamagishi ............. | G03B 17/00 348/208.99 |

(Continued)

FOREIGN PATENT DOCUMENTS

JP  2004-187298  7/2004

*Primary Examiner* — Helen Shibru
(74) *Attorney, Agent, or Firm* — Nixon & Vanderhye P.C.

(57) ABSTRACT

An example of an information processing device displays a moving image on at least one display device. The information processing device first acquires moving image data which includes at least one piece of data of panorama moving image including panorama images each representing an image of a range wider than the range displayed on the display device and also includes at least one piece of data of non-panorama moving image including non-panorama images each representing an image of a range substantially the same as the range displayed on the display device. The information processing device reproduces the at least one piece of data of panorama moving image and the at least one piece of data of non-panorama moving image in an order defined by the moving image data during a time duration from a start to an end of the moving image.

20 Claims, 9 Drawing Sheets

(51) Int. Cl.
*H04N 5/76* (2006.01)
*H04N 5/44* (2011.01)

(56) References Cited

U.S. PATENT DOCUMENTS

| | | | | |
|---|---|---|---|---|
| 2001/0013917 A1* | 8/2001 | Ishimaru | G02F 1/134327 | 349/147 |
| 2004/0105597 A1 | 6/2004 | Lelescu et al. | | |
| 2010/0046803 A1* | 2/2010 | Tomita | G06T 3/4038 | 382/106 |
| 2010/0066810 A1* | 3/2010 | Ryu et al. | | 348/36 |
| 2011/0007130 A1* | 1/2011 | Park | H04N 7/181 | 348/38 |
| 2011/0032326 A1* | 2/2011 | Hollander | G01J 5/02 | 348/36 |
| 2011/0216179 A1* | 9/2011 | Dialameh et al. | | 348/62 |
| 2012/0062748 A1* | 3/2012 | Ofek | G08G 1/04 | 348/149 |
| 2012/0169840 A1* | 7/2012 | Yamashita | H04N 5/232 | 348/36 |
| 2012/0242779 A1* | 9/2012 | Liu et al. | | 348/36 |
| 2012/0249957 A1* | 10/2012 | Shibata | A61B 3/0025 | 351/206 |
| 2013/0033566 A1* | 2/2013 | Sento | G03B 37/02 | 348/36 |
| 2013/0163854 A1* | 6/2013 | Cheng | | 382/154 |
| 2013/0182066 A1* | 7/2013 | Ishimoto | H04N 7/181 | 348/38 |
| 2013/0201214 A1* | 8/2013 | Piippo et al. | | 345/633 |
| 2013/0258044 A1* | 10/2013 | Betts-Lacroix | H04N 13/0242 | 348/36 |
| 2014/0098188 A1* | 4/2014 | Kwak | G06T 3/40 | 348/38 |
| 2014/0132706 A1* | 5/2014 | Kira | H04N 13/0242 | 348/36 |
| 2014/0194164 A1* | 7/2014 | Lee | G06F 3/0485 | 455/566 |
| 2015/0321607 A1* | 11/2015 | Cho | B60R 11/04 | 348/36 |

* cited by examiner

F I G. 1
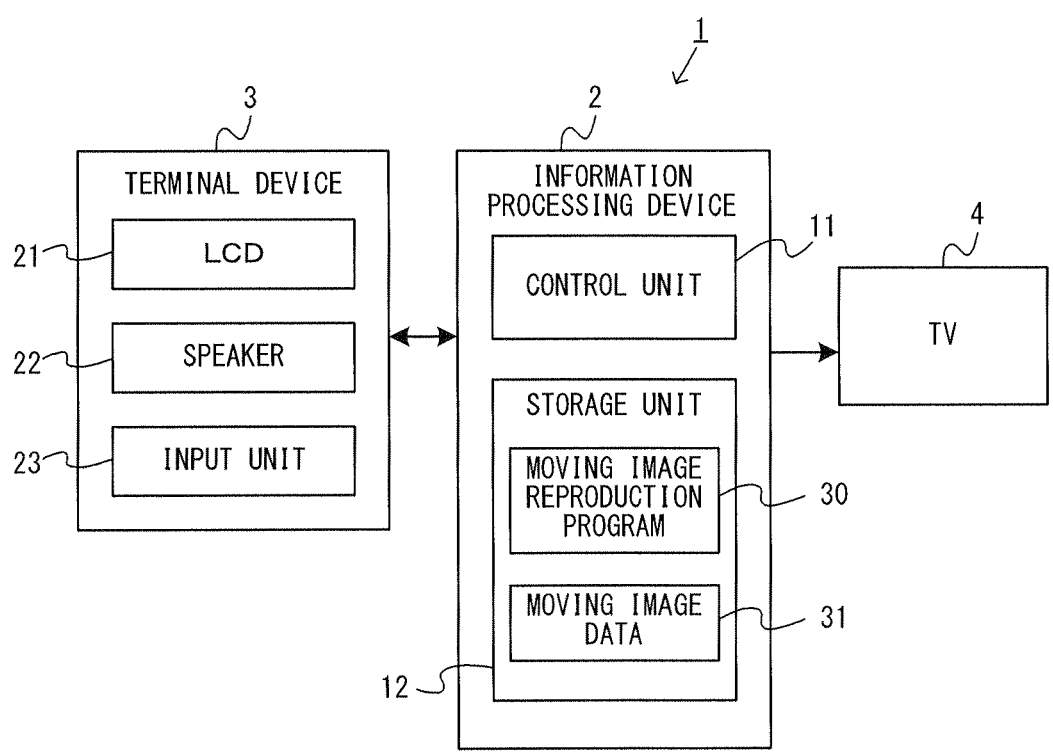

F I G. 4
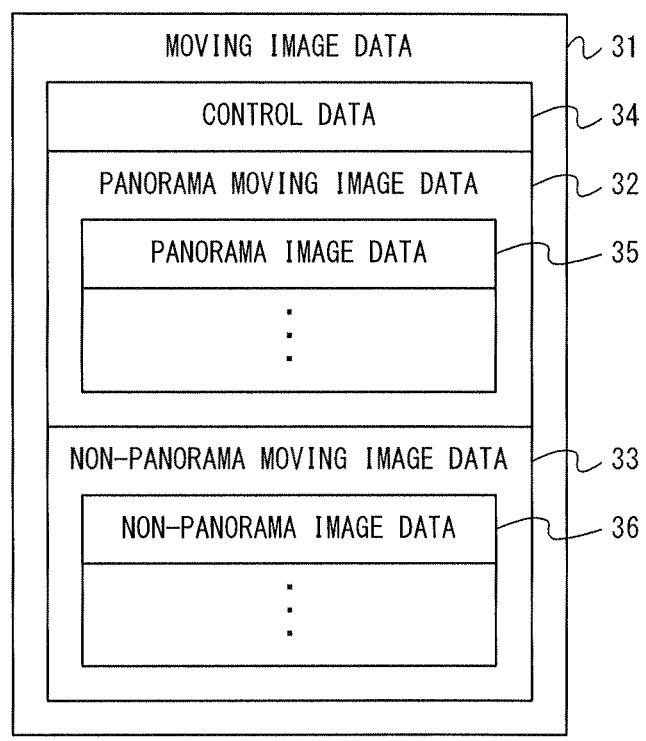

INFORMATION PROCESSING DEVICE, STORAGE MEDIUM HAVING MOVING IMAGE DATA STORED THEREON, INFORMATION PROCESSING SYSTEM, STORAGE MEDIUM HAVING MOVING IMAGE REPRODUCTION PROGRAM STORED THEREON, AND MOVING IMAGE REPRODUCTION METHOD

CROSS REFERENCE TO RELATED APPLICATION

The disclosure of Japanese Patent Application No. 2013-055315 filed on Mar. 18, 2013 is incorporated herein by reference.

FIELD

The technology herein relates to an information processing device, a storage medium having moving image data stored thereon, an information processing system, a storage medium having a moving image reproduction program stored thereon, and a moving image reproduction method, for reproducing a moving image on a display device.

BACKGROUND AND SUMMARY

Conventionally, there is a technology for generating a panorama image and displaying the panorama image on a display device.

Such a conventionally technology merely allows a panorama image to be displayed. Therefore, it is now desired that a moving image is reproduced in a wider variety of forms.

Accordingly, this application discloses an information processing device, a storage medium having moving image data stored thereon, an information processing system, a storage medium having a moving image reproduction program stored thereon, and a moving image reproduction method, which are capable of reproducing a moving image in a wider variety of forms.

(1)

An example of information processing device described in this specification displays moving image on at least one display device. The information processing device includes a moving image acquisition unit and a moving image reproduction unit.

The moving image acquisition unit acquires moving image data which includes at least one piece of data of panorama moving image including panorama images each representing an image of a range wider than the range displayed on the display device and also includes at least one piece of data of non-panorama moving image including non-panorama images each representing an image of a range substantially the same as the range displayed on the display device. The moving image reproduction unit reproduces the at least one piece of data of panorama moving image and the at least one piece of data of non-panorama moving image in an order defined by the moving image data during a time duration from a start to an end of the moving image.

According to the structure of (1), the information processing device can reproduce the moving image in two forms, namely, the panorama moving image in which an image of a part of a relatively wide visual field is displayed, and the non-panorama moving image in which an image of substantially the entirety of a relatively narrow visual field is displayed.

(2)

The information processing device may be capable of displaying the moving image on a first display device and a second display device. The moving image reproduction unit may include a panorama reproduction unit and a non-panorama reproduction unit. The panorama reproduction unit, for reproducing the panorama moving image during the time duration, displays a moving image of a prescribed range of the panorama moving image on the first display device, and displaying a moving image, of a range changed by an operation made by a user, of the panorama moving image on the second display device. The non-panorama reproduction unit, for reproducing the non-panorama moving image during the time duration, displays the non-panorama moving image on the first display device.

According to the structure of (2), the non-panorama moving image is displayed on the first display device, which is different from the second display device which displays the display range of the moving image that is changed in accordance with an operation made by the user is displayed during the reproduction time duration of the panorama moving image. Therefore, for the user viewing the second display device during the reproduction time duration of the panorama moving image, the display device to view is switched in accordance with the switching between the panorama moving image and the non-panorama moving image. Thus, according to the structure of (2), switching between the panorama moving image and the non-panorama moving image can be notified to the user in an easy-to-see (natural) manner.

(3)

For reproducing the non-panorama moving image during the time duration, the non-panorama reproduction unit may display, on the second display device, an image notifying a suggestion that the first display device should be viewed.

According to the structure of (3), it can be notified more clearly to the user that the panorama moving image has been switched to the non-panorama moving image.

(4)

When the reproduction of the non-panorama moving image is to be switched to the reproduction of the panorama moving image during the time duration, the non-panorama reproduction unit may make a notification by an image and/or a sound by use of the second display unit before the reproduction of the non-panorama moving image is switched to the reproduction of the panorama moving image.

According to the structure of (4), switching of the non-panorama moving image to the panorama moving image can be notified to the user before the switching.

(5)

The moving image data may include type data by which it is distinguished whether an image in each of frames during the time duration from the start to the end of the moving image is a panorama image or a non-panorama image. The moving image reproduction unit may distinguish, based on the type data, whether an image in each of the frames is a panorama image or a non-panorama image, and may reproduce the moving image by a reproduction processes which is different in accordance with the distinguishing result.

According to the structure of (5), the information processing device can easily distinguish whether an image in each frame is a panorama image or a non-panorama image by use of the type data. Since a different reproduction process is executed in accordance with the distinguishing result, the information processing device can execute an appropriate reproduction process suitable to the type of the image.

(6)

When the image of a certain frame during the time duration is distinguished as the panorama image, the moving image reproduction unit may select, as a display target, an image, of a range determined by an operation made by the user, of the panorama image for the certain frame; and when the image of a certain frame during the time duration is distinguished as the non-panorama image, the moving image reproduction unit may select, as a display target, the range of the non-panorama image for the certain frame.

According to the structure of (6), the information processing device can present an image of a range in accordance with an operation made by the user during the reproduction of the panorama moving image, and can present the non-panorama image with certainty during the reproduction of the non-panorama image. As can be seen, according to the structure of (6), an appropriate display target suitable to the reproduction form (panorama moving image or non-panorama moving image) can be selected and presented to the user.

(7)

An example of storage medium described in this specification has stored thereon moving image data usable for reproducing a moving image on a display device. The moving image data includes at least one piece of data of panorama moving image and at least one piece of data of non-panorama moving image. The data of panorama moving image includes panorama images each representing an image of a range wider than the range displayed on the display device. The data of non-panorama moving image includes non-panorama images each representing an image of a range substantially the same as the range displayed on the display device. The moving image data is structured such that the at least one piece of data of panorama moving image and the at least one piece of data of non-panorama moving image are reproduced in an order defined by the moving image data during a time duration from a start to an end of the moving image.

According to the structure of (7), one moving image reproduced in a plurality of reproduction forms can be provided. Namely, one moving image reproduced in two reproduction forms, i.e., the panorama moving image in which an image of a part of a relatively wide visual field is displayed, and the non-panorama moving image in which an image of substantially the entirety of a relative narrow visual field is displayed, can be provided.

(8)

The moving image data may further include type data by which it is distinguished whether an image in each of frames during the time duration from the start to the end of the moving image is a panorama image or a non-panorama image.

According to the structure of (8), the information processing device for reproducing the moving image can easily distinguish whether an image in each frame is a panorama image or a non-panorama image by use of the type data.

(9)

Data of the panorama moving image of one frame and data of the non-panorama moving image of one frame may each represent an image area of a prescribed size. The data of the panorama moving image may represent a panorama image by use of a part of the image area of the prescribed size. The data of the non-panorama moving image may represent a non-panorama image by use of a part of the image area of the prescribed size.

According to the structure of (9), the data of the panorama moving image and the data of the non-panorama moving image have the same image area. Therefore, the structure of the moving image can be simplified. In addition, the device for reproducing the moving image can handle two types of data of the panorama image data and the non-panorama image data in substantially the same manner. Thus, the process for the moving image data is simplified.

(10)

The data of the panorama moving image and the data of the non-panorama moving image may be compressed by a prescribed method The compressed data of the non-panorama moving image of one frame may be structured to have a smaller data amount than that of the compressed data of the panorama moving image of one frame.

According to the structure of (10), the data amount of the moving image data can be reduced by compression. In addition, a non-panorama moving image can be used in a part of the entire moving image, so that the data amount of the moving image can be reduced as compared with the case where the entire moving image only includes panorama moving images.

(11)

The non-panorama image may have a higher resolution that that of the panorama image.

According to the structure of (11), the non-panorama moving image can be presented with a higher image quality. For example, when a moving image of a part of the entire moving image to which it is wished that the user should pay attention is formed of a non-panorama image, the moving image of the part to which it is wished that the user should pay attention can be presented with a high image quality with no increase in the data amount.

(12)

The data of the panorama moving image and the data of the non-panorama moving image may be included in one data file.

According to the structure of (12), the device for reproducing the moving image can reproduce the moving image including both of the panorama moving image and the non-panorama moving image by executing one data file. Therefore, it is made easier to handle the moving image including two types of images, namely, the panorama moving image and the non-panorama moving image.

(13)

The data of the panorama moving image, the data of the non-panorama moving image, and the type data may be included in one data file.

According to the structure of (13), even when the type data is set, like in the structure of (12), the moving image including both of the panorama moving image and the non-panorama moving image can be reproduced by executing one data file. Owing to this, it is made easier to handle the moving image including two types of images, namely, the panorama moving image and the non-panorama moving image.

(14)

A visual field of the non-panorama moving image may correspond to a part of a visual field of the panorama moving image.

According to the structure of (14), the content of the panorama moving image and the content of the non-panorama can be made continuous to each other. For example, in the case where a specific object or a specific person appears in the panorama moving image, a non-panorama moving image is provided as the moving image in a time duration in which the specific object or the specific person appears. In this manner, the user is caused to pay attention to the object or the person.

This specification discloses an information processing system including one or more devices having an equivalent function to that of the information processing device of (1) through (6). This specification also discloses a moving image reproduction program for causing a computer to act as a unit equivalent to each unit of the information processing device of (1) through (6). This specification further discloses a moving image reproduction method executed by the information processing system.

These and other objects, features, aspects and advantages will become more apparent from the following detailed description when taken in conjunction with the accompanying drawings.

According to the information processing device, the storage medium storing moving image data stored thereon, the information processing system, the storage medium having a moving image reproduction program stored thereon, and the moving image reproduction method described above, a moving image can be reproduced in two reproduction forms of a panorama moving image and a non-panorama moving image. Thus, the moving image can be reproduced in a wider variety of forms.

BRIEF DESCRIPTION OF THE DRAWINGS

FIG. 1 is a block diagram showing an example of non-limiting information processing system;

FIG. 4 shows an example of data structure of the moving image data;

DETAILED DESCRIPTION OF NON-LIMITING EXAMPLE EMBODIMENTS

1. Structure of Information Processing System

Figure 2:
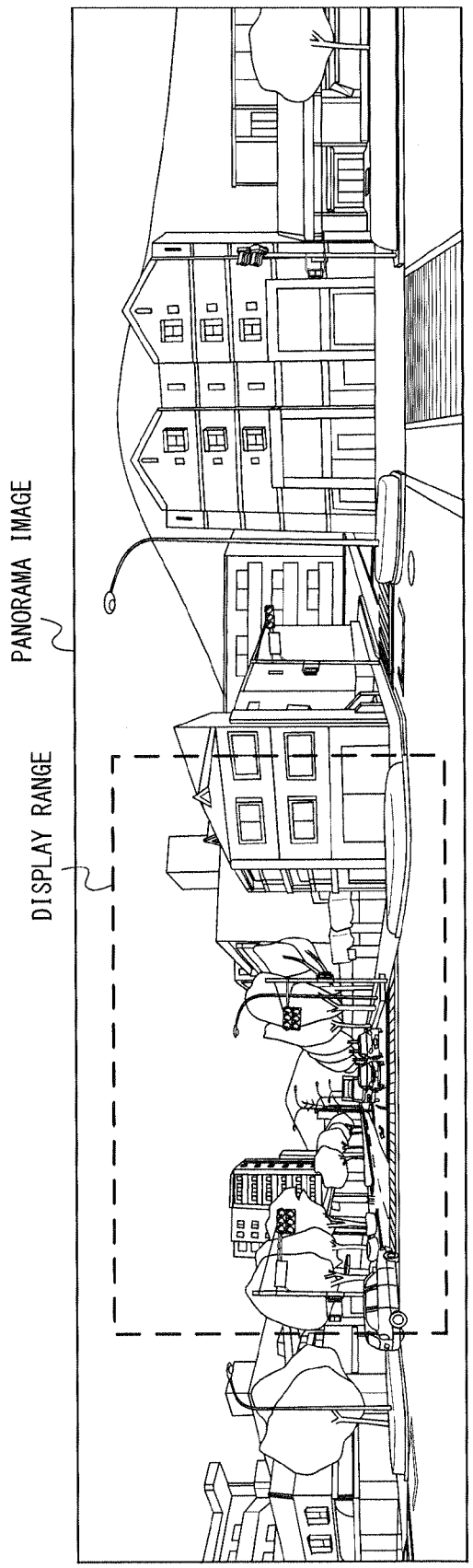
FIG. 2 shows an example of panorama image.

Hereinafter, an information processing device, a data structure of moving image data, an information processing system, a moving image reproduction program, and a moving image reproduction method in an example of the example embodiment will be described. FIG. 1 is a block diagram showing an example of information processing system according to the example embodiment. Referring to FIG. 1, an information processing system 1 includes an information processing device 2, a terminal device 3, and a TV 4. The information processing system 1 in the example embodiment is for displaying a moving image on a display device (terminal device 3 and/or the TV 4).

The information processing system 1 includes the information processing device 2. The information processing device 2 executes information processes performed by the information processing system 1, for example, a process of reproducing a moving image. The information processing device 2 may be any type of information processing device and may be for example, a personal computer, a game device, a mobile terminal, a smart phone or the like. The information processing device 2 is communicable with the terminal device 3 and the TV 4. The communication between the information processing device 2 and the terminal device 3 or the TV 4 may be wired or wireless.

As shown in FIG. 1, the information processing device 2 includes a control unit 11. The control unit 11 includes a CPU and a memory. The information processing device 2 executes an information process by the CPU executing a prescribed information processing program (moving image reproduction program 30) by use of the memory. The information processing device 2 may have any structure as long as the information process as described above can be executed. For example, a part of, or the entirety of, the information process may be executed by a dedicated circuit. In the example embodiment, such an information process causes an image (moving image) to be output from the information processing device 2 to the terminal device 3 and/or the TV 4, which is a display device. The information processing device 2 may output a sound, which is to be output together with the moving image, to the terminal device 3 and/or the TV 4.

The information processing device 2 includes a storage unit 12. The storage unit 12 is an optional type of storage device accessible by the control unit 11. The storage unit 12 may be, for example, a storage unit built in the information processing device 2, such as, for example, a hard disc or the like, or a storage unit attachable/detachable to/from the information processing device 2, such as, for example, an optical disc or the like.

The storage unit 12 stores the moving image reproduction program 30 and moving data 31. The moving image reproduction program 30 is an information processing program for reproducing the moving data 31. The information process executed by use of the moving image reproduction program 30 will be described later in detail (see FIG. 10).

The moving data 31 is data representing a moving image to be reproduced by the information processing system 1. In the example embodiment, the moving image data 31 is stored in advance in the storage unit 12. In another embodiment, the moving image data 31 may be transmitted (streaming-transmitted) from an external server to the information processing system 1 and reproduced. Although not described in detail, in the example embodiment, the moving image data 31 includes panorama images and non-panorama images in mixture. The control unit 11 outputs a moving image based on the moving image data 31 to the terminal device 3 and/or the TV 4, which acts as a display device.

The information processing system 1 includes the terminal device 3. The terminal device 3 includes an LCD (liquid crystal display) 21, which is an example of display unit. Namely, the terminal device 3 may be considered as a display device. In the example embodiment, the terminal device 3 is a portable (also referred to as "mobile") display device. The terminal device 3 receives an image (moving image) transmitted from the information processing device 2 and displays the image on the LCD 21.

The terminal device 3 includes a speaker 22, which is an example of sound output unit. The terminal device 3 receives sound data transmitted from the information processing device 2 and outputs the sound through the speaker 22.

The terminal device 3 includes an input unit 23. The input unit 23 accepts an operation of a user and outputs operation data representing the operation of the user. The input unit 23 may be an operation device such as, for example, a touch panel, a slide pad, a cross key and/or a button. The input unit 23 may be a device capable of sensing an operation of moving the terminal device 3, such as, for example, an attitude sensor (acceleration sensor, gyrosensor or the like). The terminal device 3 transmits operation data output from the input unit 23 to the information processing device 2. As described above, in the example embodiment, the display device and the operation device are integrated together. In another embodiment, the display device and the operation device may be separate from each other.

The TV 4 is an example of display device for displaying an image (moving image). The TV 4 is an example of stationary display device. When an image is transmitted from the information processing device 2 to the TV 4, the TV 4 displays the image. The TV 4 may include a speaker. When a sound is transmitted from the information processing device 2 to the TV 4, the TV 4 outputs the sound.

In the information processing system 1, the information processing device 2 executes an information process in accordance with an input made on the terminal device 3, and an image (moving image) obtained as a result of the execution is displayed on the terminal device 3 and/or the TV 4. As can be seen, in the example embodiment, the information processing system 1 has a structure by which an input function, an information processing function and a display function are realized by a plurality of devices. In another embodiment, the information processing system 1 may include a single information processing device having these functions (e.g., mobile or portable information processing device). In still another embodiment, the functions of the information processing device 2 may be realized by a plurality of devices. For example, in such an embodiment, at least a part of the information processes which would be executed by the information processing device 2 may be executed by a plurality of devices communicable with each other via a network (wide area network and/or local area network).

2. Overview of Moving Image Reproduction

Now, an overview of a process of reproducing a moving image in the example embodiment will be described. Herein, the moving image data 31 to be reproduced by the information 1 includes panorama moving image data and non-panorama moving image data. Namely, in the example embodiment, a moving image including a panorama moving image and a non-panorama moving image is reproduced by the information processing system 1.

(Panorama Moving Image)

Herein, a panorama moving image is a moving image including a plurality of panorama images. A panorama image is an image having a range wider than the range displayed on the display device. FIG. 2 shows an example of panorama image. As shown in FIG. 2, the panorama image is an image having a visual field wider than the visual field of the image displayed on the display device. Namely, when a panorama image is displayed on the display device, a part thereof (e.g., the range enclosed by the dashed line in FIG. 2) is displayed basically. The information processing system 1 may have a function of displaying the entire panorama image on the display device. For example, in the case where a plurality of display devices are used as in the example embodiment, the entire panorama image may be displayed on a part of the display devices. In this specification, a range of a panorama image that is displayed on the display device is referred to as a "display range". A panorama image may be considered as an image, a display range of which is determined (when displayed on a display device). The display range may be changed (moved) in accordance with an operation made by the user. When the display range is moved, the panorama image may be considered as an image, a line-of-sight direction of which is changed by the change of the display range.

The panorama image shown in FIG. 2 as an example has a viewing angle of about 180° in a left and right direction. In the example embodiment, a panorama image having an omnidirectional (360°) viewing angle in up-down and left-right directions is used. However, a panorama image may have a dead angle, and may have a viewing angle of about 180°. For example, an image having a viewing angle of 180° or greater in a certain direction may be considered as a panorama image. A panorama image may be an actual image (image of an actual object) captured by a camera, or may be partially or entirely a virtual image (CG image).

For reproducing a panorama moving image, the information processing system 1 executes a process of determining the display range of the panorama moving image and a process of outputting an image of the determined display range to the display device (terminal device 3 and/or TV 4). These processes are repeated every frame time, and thus the panorama moving image is reproduced by the display device.

A panorama moving image may have a point of view thereof moved as the time elapses or may have a point of view thereof not moved (fixed). When the point of view is moved, as shown in, for example, FIG. 2, a panorama image of an environment as seen from a position on a street may be displayed, and a panorama moving image proceeding on the street (panorama moving image, the point of view of which moves along the street) may be reproduced.

(Non-Panorama Moving Image)

A non-panorama moving image is a moving image including a plurality of non-panorama images. Unlike a panorama image, a non-panorama image has a range substantially the same as the range displayed on the display device. A non-panorama image is, for example, an image enclosed by the dashed line in FIG. 2. A non-panorama image may be considered as an image having an image area smaller than the image area of a panorama image. When a non-panorama image is displayed on the display device, substantially the entirety thereof is displayed basically. However, it is not necessary that the entirety of the image area in a strict sense be displayed. For example, a part close to a periphery of the image area does not need to be displayed. A non-panorama image is considered as an image, a display range of which is not determined (when displayed on the display device). The information processing system 1 may have a function of displaying a part of a non-panorama image on the display image (e.g., zoom function).

(Reproduction of Moving Image)

In the example embodiment, as described above, a moving image including a panorama moving image and a non-panorama moving image is reproduced by the information processing system 1. In the example embodiment, a panorama moving image and a non-panorama moving image are reproduced in an order defined by the moving image data in a time duration from the start to the end of the moving image. The order may be set in any manner in the moving image data. In the example embodiment, images included in the moving image data 31 (panorama images and non-panorama images) are each assigned a frame number. The images are displayed in the order of the frame numbers, and thus the moving image is reproduced.

Figure 3:
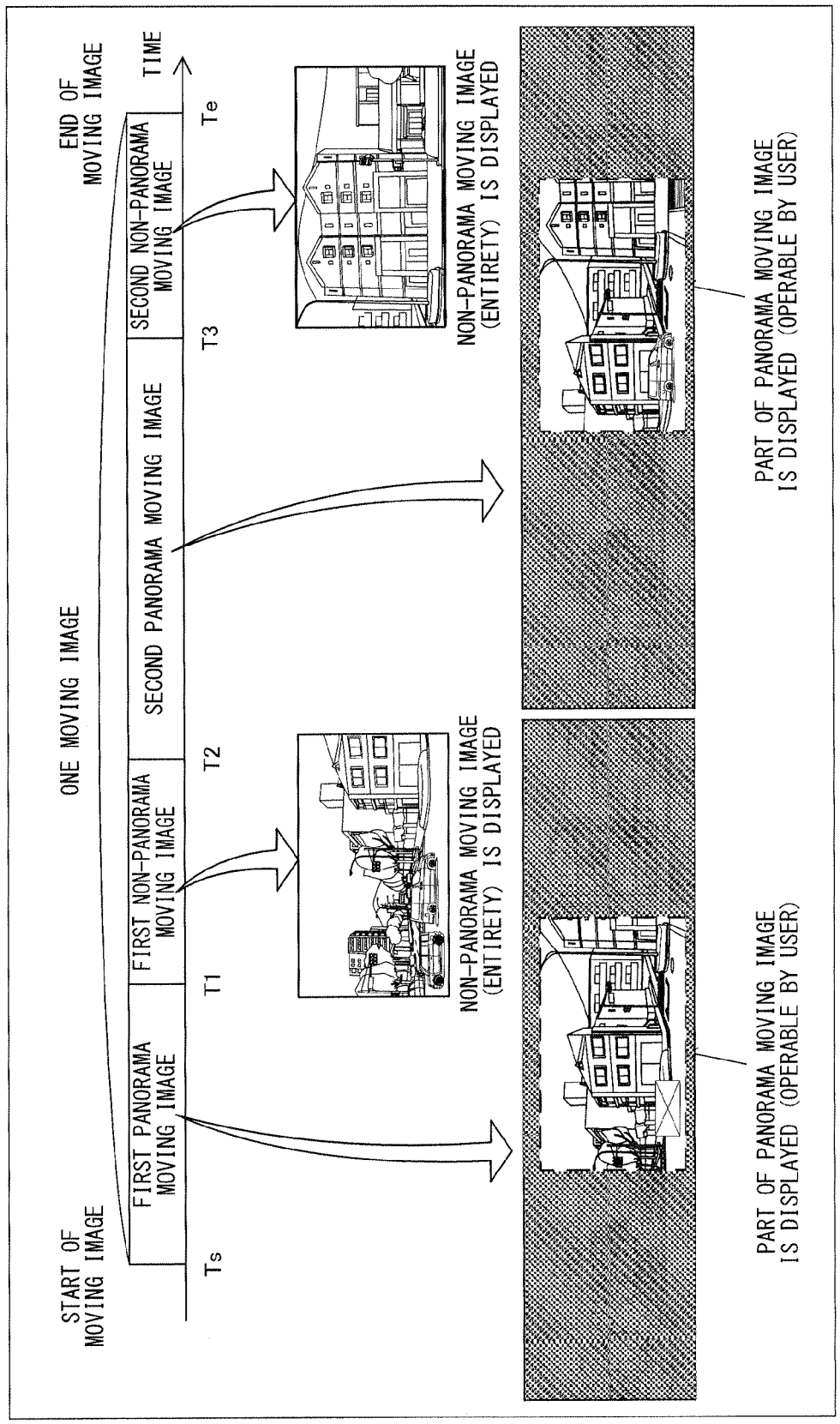
FIG. 3 shows an example of moving images reproduced by use of moving image data in the example embodiment.

FIG. 3 shows an example of moving image reproduced by use of the moving image data in the example embodiment. In the example shown in FIG. 3, one moving image includes two panorama moving images and two non-panorama moving images. Herein, a moving image including a series of images (including panorama images and non-panorama images) which are reproduced continuously will be referred to as "one moving image". A moving image including a series of panorama images which are reproduced continuously will be referred to as "one panorama moving image". A moving image including a series of non-panorama images which are reproduced continuously will be referred to as "one non-panorama moving image". As shown in FIG. 3, one moving image may include one or more panorama moving images, and one moving image may include one or more non-panorama moving images.

In the example shown in FIG. 3, a first panorama moving image, a first non-panorama moving image, a second panorama moving image and a second non-panorama moving image are reproduced in this order. Specifically, in a time duration from a start time point Ts of the moving image to time point T1, at which a time duration (T1−Ts) elapses from the start point, the first panorama moving image is reproduced. In a time duration from the time point T1 to time point T2, at which a time duration (T2−Ts) elapses from the start point, the first non-panorama moving image is reproduced. In a time duration from the time point T2 to time point T3, at which a time duration (T3−Ts) elapses from the start point, the second panorama moving image which is different from the first panorama moving image is reproduced. In a time duration from the time point T3 to an end time point Te of the moving image, the second non-panorama moving image which is different from the first non-panorama moving image is reproduced.

In the reproduction time durations of the panorama moving images (time duration from the time point Ts to the time point T1, and time duration from the time point T2 to the time point T3), a part of the panorama moving image (e.g., range enclosed by the dashed line in FIG. 3) is displayed on each display device as a display range. Although described in detail later, in the example embodiment, an image of a range of the panorama image that is determined based on an operation made by the user is displayed on the terminal device 3. An image of a predefined range of the panorama image is displayed on the TV 4. Therefore, during the reproduction time durations of the panorama moving images, the user can select a range of a desired direction from the panorama moving images.

By contrast, during the reproduction time durations of the non-panorama moving images (time duration from the time point T1 to the time point T2, and time duration from the time point T3 to the time point Te), the entirety of the non-panorama moving image is displayed on the display device (see FIG. 3). Although described in detail later, in the example embodiment, the non-panorama moving image is displayed on the TV 4. Therefore, during the reproduction time durations of the non-panorama moving images, an image of a predetermined range is provided to the user.

As described above, in the example embodiment, the information processing system 1 reproduces one or more panorama moving images and one or more non-panorama moving images during the time duration from the start to the end of the moving image in an order defined by the moving image data 31. As can be seen, the information processing system 1 can reproduce one moving image in two reproduction forms, namely, a panorama moving image, a display range of which can be selected by the user, and a non-panorama moving image, a prescribed range of which is presented.

In the example embodiment, the moving image can be reproduced in a wider variety of forms. Thus, the moving image can be provided to the user in a manner which is not available conventionally, and thus the staging effect of the moving image can be improved. For example, if the user can always freely operate the line-of-sight direction (display range) of a panorama moving image, the user may not see the target (character, etc.) to which the content creator wishes the user to pay attention. The reason for this is that the user may not put the line-of-sight direction (display range) toward the target during a time duration in which the target appears. According to the example embodiment, a non-panorama moving image may be provided as the moving image during the time duration in which the content creator wishes the user to pay attention to the target. In this manner, the user is caused to see the target with certainty. In the example shown in FIG. 3, during the time duration from the time point T2 to the time point T3, the panorama moving image is provided, so that the user can view the image in the line-of-sight direction desired by the user; whereas during the time duration from the time point T3 to the time point Te, the user is caused to pay attention to a specific building appearing in the panorama moving image.

3. Details of Moving Image Data

Now, details of the moving image data 31 will be described. FIG. 4 shows an example of data structure of the moving image data 31. In the example embodiment, the moving image data 31 has the data structure shown in FIG. 4. However, the data structure of the moving image data 31 may be any data structure by which at least one piece of data of panorama moving image and at least one piece of data of non-panorama moving image are reproduced in an order defined by the moving image data during the time duration from the start to the end of the moving image.

(Panorama Moving Image Data and Non-Panorama Moving Image Data)

As shown in FIG. 4, the moving image data 31 includes panorama moving image data 32. The panorama moving image data 32 includes a plurality of pieces of panorama moving image data 35 representing a plurality of panorama images forming a panorama moving image. Each piece of data of panorama image is assigned a frame number described above. In the case where one moving image includes a plurality of panorama moving images, the moving image data 31 may include pieces of panorama moving image data corresponding to the number of the panorama moving images.

The moving image data 31 also includes non-panorama moving image data 33. The non-panorama moving image data 33 includes a plurality of pieces of non-panorama moving image data 36 representing a plurality of non-panorama images forming a non-panorama moving image. Each piece of data of non-panorama image is assigned a frame number described above. In the case where one moving image includes a plurality of non-panorama moving images, the moving image data 31 may include pieces of non-panorama moving image data corresponding to the number of the non-panorama moving images.

Figure 5:
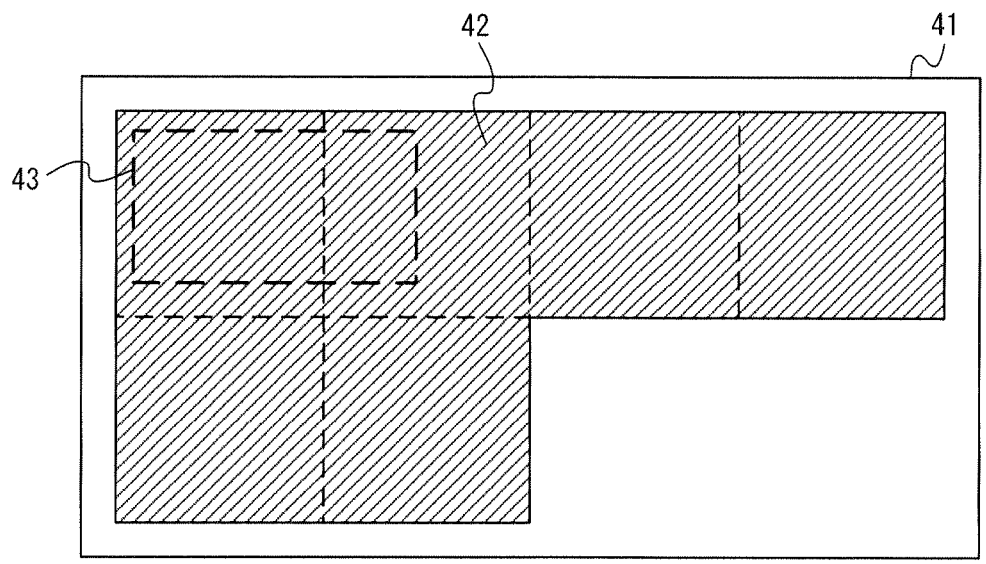
FIG. 5 shows an example of image area represented by panorama image data.

FIG. 5 shows an example of image area represented by the panorama image data. In the example embodiment, one piece of panorama image data 35 represents an image area 41 having a prescribed size. More specifically, the panorama image data 35 is data representing at least a color value of each of pixels included in the image area 41. In the example embodiment, a panorama image is represented by use of a hatched area 42, which is a part of the image area 41. The part of the image area 41 other than the hatched area 42 is not used for representing the panorama image. In this area, information other than the image information may be embedded, or no information may be embedded.

In the example embodiment, in a process of generating an image of a display range, the panorama image is projected (mapped) to each plane of a regular hexahedron. Therefore, the hatched area 42 is formed of six squares. It should be noted that the hatched area 42 for representing the panorama image may have any shape. In FIG. 5, a dashed area 43 enclosed by the dashed line has a size corresponding to the display range. It is clear from FIG. 5 that a part of the panorama image is a display range.

Figure 6:
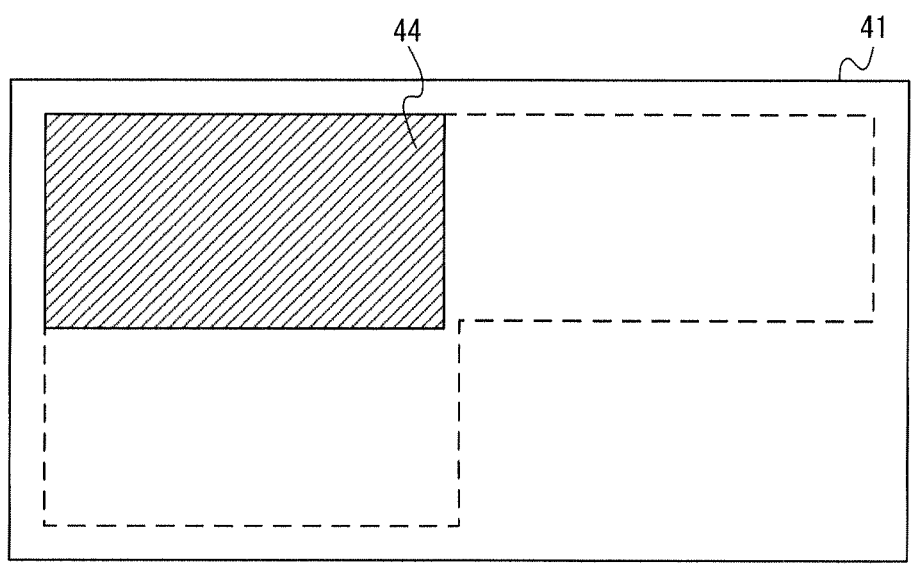
FIG. 6 shows an example of image area represented by non-panorama image data.

FIG. 6 shows an example of image area represented by the non-panorama image data. As shown in FIG. 6, one piece of non-panorama image data 36 represents the image area 41 having the prescribed size like the panorama image data 35. Namely, in the example embodiment, the panorama moving image data of one frame and the non-panorama moving image data of one frame represent the same size of image area. The non-panorama image is represented by use of a hatched area 44, which is a part of the image area 41. The part of the image area 41 other than the hatched area 44 is not used for representing the non-panorama image. Whereas the panorama image is not an image of one screen, the non-panorama image is an image of one screen. Therefore, the area 42 for representing the panorama moving image and the area 44 for representing the non-panorama moving image may be different from each other in the shape and/or the size. Accordingly, the area 42 for representing the panorama moving image in the image area 41 and the area 44 for representing the non-panorama moving image in the image area 41 are different from each other (not overlapped) at least partially.

As described above, in the example embodiment, the panorama moving image data of one frame and non-panorama moving image data of one frame represent the same size of image area 41. The panorama moving image data represents the panorama image by use of a part of the image area 41, and the non-panorama moving image data represents the non-panorama image by use of a part of the image area 41 (that is at least partially different from the part used for representing the panorama image). Owing to this, at least two types of data can have the same format (image area). Therefore, the structure of the moving image data can be simplified. The information processing system 1 can handle two types of data, namely, the panorama image data and the non-panorama image data, in substantially the same manner. Therefore, the process for the moving image data is simplified. In another embodiment, the panorama moving image data of one frame and the non-panorama moving image data of one frame may represent different size of image areas.

In the example embodiment, the panorama moving image data and the non-panorama moving image data are stored as being compressed by a prescribed method. As shown in FIG. 5 and FIG. 6, the area 44 for representing the non-panorama moving image is smaller than the area 42 for representing the panorama moving image. Therefore, the compressed non-panorama moving image data of one frame is structured to have a smaller data amount than that of the compressed panorama moving image data of one frame. In the example embodiment, a non-panorama moving image is included in a part of the entire moving image, and thus the data amount of the moving image data 31 can be smaller than in the case where the entire moving image only includes panorama moving images.

In the example embodiment, the non-panorama image is generated so as to have a higher resolution than that of the panorama image. Namely, as shown in FIG. 5 and FIG. 6, the area 44 for representing the non-panorama moving image is larger than the area 43 corresponding to the display range of the panorama image. In other words, the area 44 of one screen when the non-panorama image is reproduced is larger than the area 43 of one screen when the panorama image is reproduced. The resolution of the non-panorama image is made higher than the resolution of the panorama image in this manner, so that a part of the entire moving image to which it is wished that the user should pay attention can be presented with a high image quality. Also in the example embodiment, the moving image of the part of the entire moving image to which it is wished that the user should pay attention is formed of a non-panorama image (represented by an area smaller than the area for representing the panorama image). Therefore, the moving image of the part can be presented with a high image quality with no increase in the data amount. In another embodiment, the panorama image and the non-panorama image may have the same resolution, or the panorama image may have a resolution higher than the resolution of the non-panorama image.

(Control Data)

As shown in FIG. 4, the moving image data 31 includes control data 34. The control data 34 is used for controlling the reproduction of a moving image. In the example embodiment, the control data 34 includes type data by which the type of the moving image (panorama moving image or non-panorama image) is distinguished at each time point during the time duration from the start to the end of the moving image.

The type data may be any type of information by which the type of the image is distinguished at each time point (each frame) during the reproduction time duration of the moving image. For example, the type data may represent the type of the image in the first frame and the frame number of the time point at which the type of the image is switched to another type. Alternatively, for example, the type data may represent information which associates the frame number and the type of the image in each frame on a frame-by-frame basis. Although described in detail later, the information processing system 1 uses the type data to find the type of the moving image is to be switched during the reproduction time duration of the moving image.

In the example embodiment, the moving image data 31 is structured as one data file. Namely, the panorama moving image data, the non-panorama moving image data, and the type data are included in one data file. Owing to this, the information processing system 1 can reproduce a moving image including both of a panorama moving image and a non-panorama moving image by executing one data file. Namely, it is made easier to handle a moving image including two types of images, namely, a panorama moving image and a non-panorama moving image.

In another embodiment, the moving image data 31 may include a plurality of data files. For example, one panorama moving image or one non-panorama moving image may be structured as one data file, and each data file may include information defining the order of reproduction (e.g., frame number, data file to be reproduced next to the each data file, etc.).

The panorama image and the non-panorama image included in one moving image may be of the same content. Herein, the "case where the panorama image and the non-panorama image are of the same content" is, for example, a case where the panorama image and the non-panorama image are images of the same location captured at the same point of view, or images of the same target. For example, as shown in FIG. 3, the non-panorama moving image may represent a part of the scenery represented by the panorama moving image. In other words, the non-panorama moving image may correspond to a part of the visual field of the panorama moving image. In this case, the content of the panorama moving image and the content of the non-panorama moving image can be made continuous to each other. For example, in the case where a specific object or a specific person appears in the panorama moving image, a non-panorama moving image is provided as the moving image in a time duration in which the specific object or the specific person appears, so that the user is caused to pay attention to the object or the person.

The panorama moving image and the non-panorama moving image included in one moving image may be of different contents. For example, the non-panorama moving image may include images explaining the panorama moving image which is reproduced before or after the non-panorama moving image (image of text information explaining the content of the panorama moving image, etc.). More specifically, the non-panorama moving image may be a message (and animation) that "now, a panorama moving image is about to be started".

4. Moving Image Reproduction by Use of Two Display Devices

Figure 7:
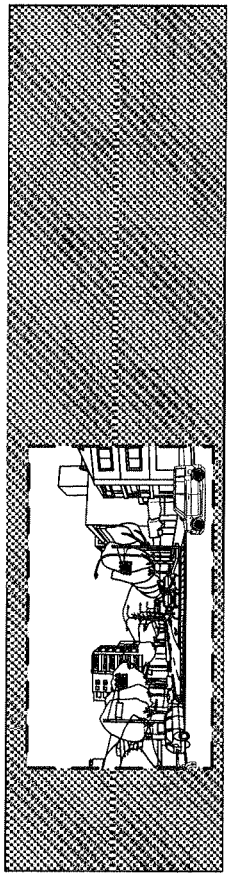
FIG. 7 shows an example of images displayed on each of display devices during reproduction of a panorama moving image and a non-panorama moving image.
Figure 8:
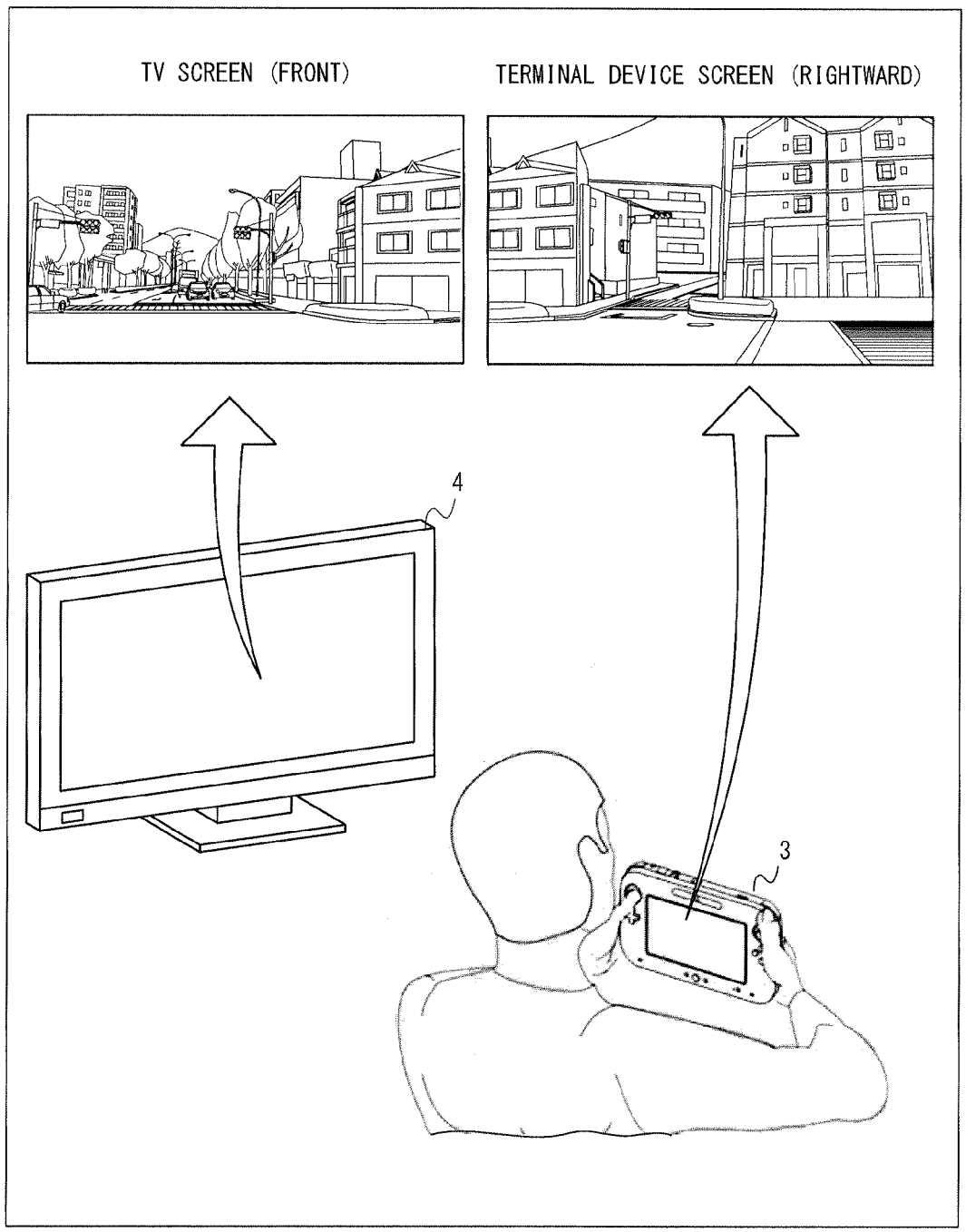
FIG. 8 shows an example of each of the display devices during a reproduction time duration of a panorama moving image.

As shown in FIG. 1, in the example embodiment, the information processing system 1 includes two display devices. FIG. 7 shows an example of images displayed on each display device when a panorama moving image is reproduced and a non-panorama moving image is reproduced. As shown in FIG. 7 and FIG. 8 (described later), in the example embodiment, a moving image including a panorama moving image and a non-panorama moving image is reproduced by use of two display devices. Owing to this, in the example embodiment, the moving image can be provided more effectively, and switching between the panorama moving image and the non-panorama moving image can be notified to the user in an easy-to-see manner.

(Reproduction of Panorama Moving Image)

First, the reproduction time duration of a panorama moving image will be described. FIG. 8 shows an example of each display device during the reproduction time duration of a panorama moving image. As shown in FIG. 7 and FIG. 8, during the reproduction time duration of the panorama moving image, a part of the panorama moving image is displayed on each of the two display devices (terminal device 3 and TV 4).

On the TV 4, a prescribed range of the panorama moving image is displayed. The prescribed range which is the display range on the TV 4 is set by a predefined method. For example, the display range on the TV 4 may be set to a predefined range (in a fixed manner) or may be set to move in accordance with a prescribed condition (or randomly). In the example embodiment, the information processing system 1 displays an image of the display range corresponding to a prescribed line-of-sight direction (e.g., in the case where the position of the point of view is moved, the moving direction (proceeding direction) of the point of view) (see FIG. 7 and FIG. 8).

On the terminal device 3, an image of a range of the panorama moving image that is changed in accordance with an operation made by the user is displayed (see FIG. 7 and FIG. 8). In the example embodiment, the display range displayed on the terminal device 3 is changed in accordance with the attitude of the terminal device 3. For example, in FIG. 8, the terminal device 3 is directed rightward with respect to the front direction (direction from the user (terminal device 3) to the TV 4). On the terminal device 3, the display range of the panorama image in the case where the line-of-sight direction is rightward with respect to the moving direction of the point of view. Since the display range is determined in accordance with an operation made by the user, the user can view the panorama moving image while freely changing the line-of-sight direction (display range) by making an operation on the terminal device 3.

In the example embodiment, the information processing system 1 sets a virtual three-dimensional space for displaying a panorama image, and locates a three-dimensional model in the three-dimensional space. In the example embodiment, a cubic three-dimensional model corresponding to the area 42 shown in FIG. 5 is located. The information processing system 1 locates a virtual camera inside the three-dimensional model (e.g., at the center inside the three-dimensional model), and controls the line-of-sight direction of the virtual camera in accordance with an operation made by the user (herein, the attitude of the terminal device 3). Thus, the information processing system 1 generates an image of the three-dimensional model as seen in the line-of-sight direction from the position of the virtual camera (inner surfaces of the three-dimensional model). At this point, a panorama image is drawn on the inner surfaces of the three-dimensional model as a texture. Owing to this, a range of the panorama image corresponding to the visual field of the virtual camera is made the display range, and an image of the display range is generated and displayed.

In another embodiment, the display range to be displayed on the terminal device 3 may be determined by any method as long as the display range is changed in accordance with an operation made by the user. The attitude of the terminal device 3 may be calculated by any method. For example, the terminal device 3 may include an attitude sensor such as an acceleration sensor and/or a gyrosensor as the input unit 23, and the information processing system 1 may calculate the attitude of the terminal device 3 based on the results of detection by the attitude sensor. In still another embodiment, an image of the display range which is changed in accordance with an operation made by the user may be displayed on the TV 4 instead of (or in addition to) the terminal device 3.

As described above, in the example embodiment, for reproducing a panorama moving image, the information processing system 1 displays a moving image of a prescribed range of the panorama moving image on a first display device (TV 4) and displays a moving image of a range of the panorama moving image that is changed in accordance with an operation made by the user on a second display device (terminal device 3). According to this, two display ranges of the panorama moving image that are set by different methods can be displayed. Thus, the panorama moving image can be presented to the user in an easy-to-view manner.

(Reproduction of Non-Panorama Moving Image)

Now, the reproduction time duration of a non-panorama moving image will be described. As shown in FIG. 7, during the reproduction time duration of the non-panorama moving image, the non-panorama moving image is displayed the first display device (TV 4). On the TV 4, substantially the entirety of the non-panorama moving image is displayed. By contrast, on the terminal device 3, the non-panorama moving image is displayed in a form having a lower visibility than on the TV 4. More specifically, on the terminal device 3, the non-panorama moving image is displayed with a lower brightness and/or chroma below a notification image 51 described later (see FIG. 7). The non-panorama moving image does not need to be displayed on the terminal device 3.

As described above, in the example embodiment, the non-panorama moving image is displayed on the first display device (TV 4), which is different from the first display device (terminal device 3) on which the display range of the moving image that is changed in accordance with an operation made by the user is displayed during the reproduction time duration of the panorama moving image. Therefore, for the user making an operation on the display range on the terminal device 3 (user viewing the terminal device 3), the display device to view is switched in accordance with the switching between the panorama moving image and the non-panorama moving image. Thus, the user can easily (naturally) recognize the switching between the panorama moving image and the non-panorama moving image. Owing to this, even when a state where the display range can be changed by an operation (when a panorama moving image is reproduced) is changed to a state where the display range cannot be changed by an operation (when a non-panorama moving image is reproduced), unnaturalness given to the user can be alleviated.

In the example embodiment, the first display device (TV 4) is stationary, whereas the second display device (terminal device 3) is portable. Therefore, the non-panorama moving image can be displayed on the stationary display device, which generally has a larger screen, and thus can be represented in an easier-to-view manner. In addition, since the panorama moving image and the non-panorama moving image are displayed on the stationary first display device, the user using the terminal device 3 and also other users can view the moving image.

In the example embodiment, as shown in FIG. 7, during the reproduction time duration of the non-panorama moving image, the notification image 51 representing a message suggesting that the user should view the TV 4 is displayed on the terminal device 3. Specifically, on the terminal device 3, the notification image 51 representing the message "view the TV" is presented to the user viewing the terminal device 3 (user holding the terminal device 3). Display of the notification image 51 on the terminal device 3 can notify the user more clearly that the panorama moving image has been switched to the non-panorama moving image. The above-described display can also direct the line-of-sight of the user toward the TV 4.

In the example embodiment, the information processing system 1 distinguishes whether the image in each frame is a panorama image or a non-panorama image, and executes a reproduction process which is different in accordance with the distinguishing result to reproduce the moving image data (see FIG. 7). This distinguishing is made based on the type data. In the example embodiment, the information processing system 1 reads the type data in the control data 34 and distinguishes the type of the image in each frame before starting the reproduction of the moving image. For reproducing the moving image, the information processing system 1 makes a determination on the reproduction process to be executed in accordance with the distinguishing result. In another embodiment, the distinguishing may be made on a frame-by-frame basis. As can be seen, the information processing system 1 can execute the distinguishing easily by use of the type data. The information processing system 1 executes a different reproduction process in accordance with the distinguishing result on the type of the image, and thus can execute a reproduction process suitable for the type of the image.

In the example embodiment, when the image to be reproduced is distinguished as a panorama image, the information processing system 1 executes, as the reproduction process, a process of selecting an image of a range of the panorama image that is determined based on an operation made by the user as the display range. When the image to be reproduced is distinguished as a non-panorama image, the information processing system 1 executes, as the reproduction process, a process of selecting the range of the non-panorama image as the display range. Owing to this, the information processing system 1 can select an appropriate display target in accordance with the reproduction form (whether the image to be reproduced is a panorama moving image or a non-panorama moving image). Namely, while the panorama moving image is being reproduced, an image of a range desired by the user can be presented; whereas while the non-panorama moving image is being reproduced, the non-panorama moving image can be presented with certainty.

(Transition from Non-Panorama Moving Image to Panorama Moving Image)

Figure 9:
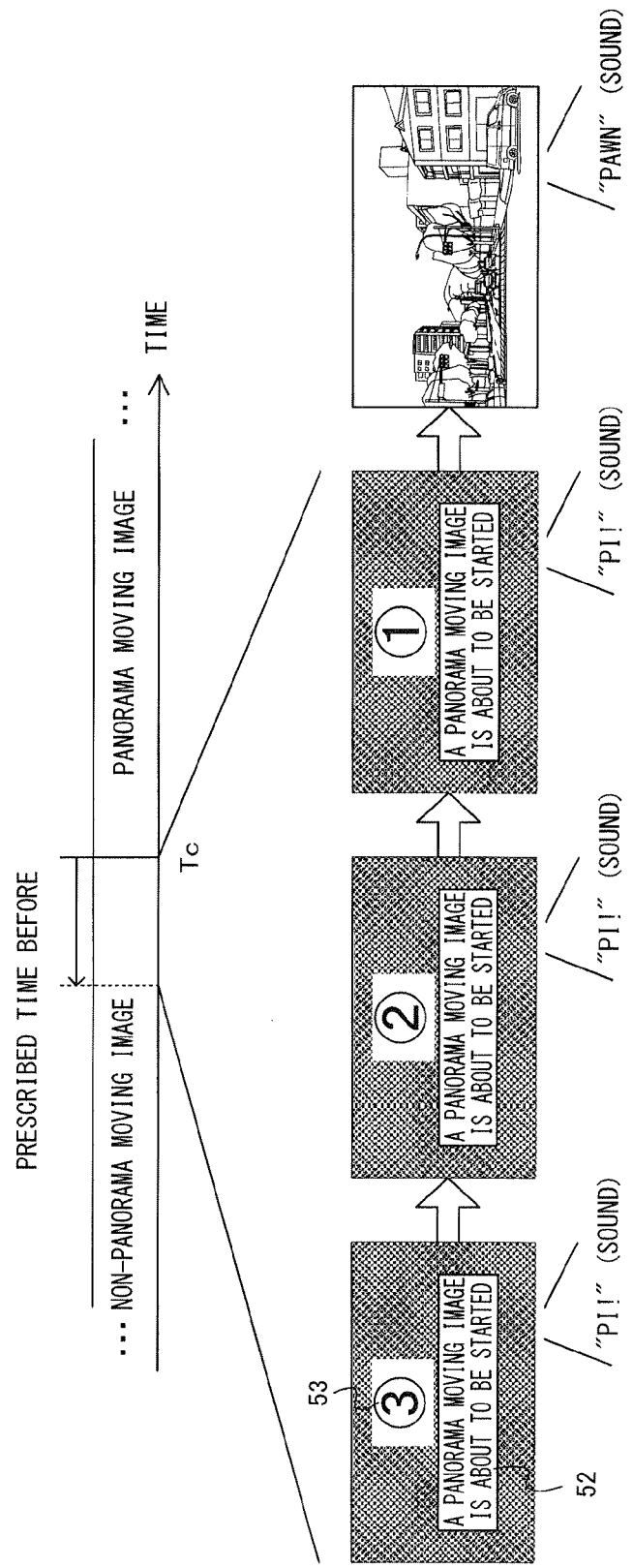
FIG. 9 shows an example of images displayed on a terminal device when a non-panorama moving image is switched to a panorama moving image.

Now, display when a non-panorama moving image is switched to a panorama moving image will be described. FIG. 9 shows an example of image on the terminal device 3 when a non-panorama moving image is switched to a panorama moving image. In the example embodiment, during the reproduction time duration of the non-panorama moving image, at a prescribed time before time point Tc at which the non-panorama moving image is switched to the panorama moving image, the information processing system 1 starts providing a notification that the non-panorama moving image is about to be switched to the panorama moving image (see FIG. 9). This notification is provided until the timing at which the non-panorama moving image is switched to the panorama moving image (or immediately thereafter). Determination on whether the timing which is a prescribed time before the time point Tc has come or not is made by use of the type data. As described above, in the example embodiment, the information processing system 1 reads the type data in the control data 34 and distinguishes the type of the image in each frame in advance before starting the reproduction of the moving image. Therefore, in the example embodiment, the timing before the switching can be found.

The above-described notification is made by an image and/or a sound by use of the terminal device 3. The notification may be made by any specific method. In the example embodiment, the method shown in FIG. 9 is used. Specifically, on the terminal device 3, a notification image 52 representing the message "a panorama moving image is about to be started", and also a notification image 53 representing the remaining time until the switch to the panorama moving image, are displayed. These notification images 52 and 53 are displayed until the time point Tc at which the non-panorama moving image is switched to the panorama moving image. From the speaker 22 of the terminal device 3, a sound is output in accordance with the remaining time. In addition, at the timing when the non-panorama moving image is switched to the panorama moving image (or at the timing immediately thereafter), a sound is output.

As described above, in the example embodiment, when the reproduction of the non-panorama moving image is to be switched to the reproduction of the panorama moving image, a notification is made by use of the terminal device 3 before the switching. Owing to this, the user can be notified of the switching before the switching occurs. In the example embodiment, during the reproduction time duration of the non-panorama moving image, the non-panorama moving image is displayed on the TV 4. Therefore, the non-panorama moving image can be kept on presented on the TV 4 with certainty even though the notification is made by use of the terminal device 3. Namely, the use of the terminal device 3 allows the notification to be made with no influence on the display of the non-panorama moving image.

The display range on the terminal device 3 immediately after the non-panorama moving image is switched to the panorama moving image may be set in any way. The display range may be set, for example, to be the same as the display range on the TV 4, or may be set based on the state of the operation made by the user at the point (e.g., attitude of the terminal device 3).

5. Details of Moving Image Reproduction Process

Figure 10:
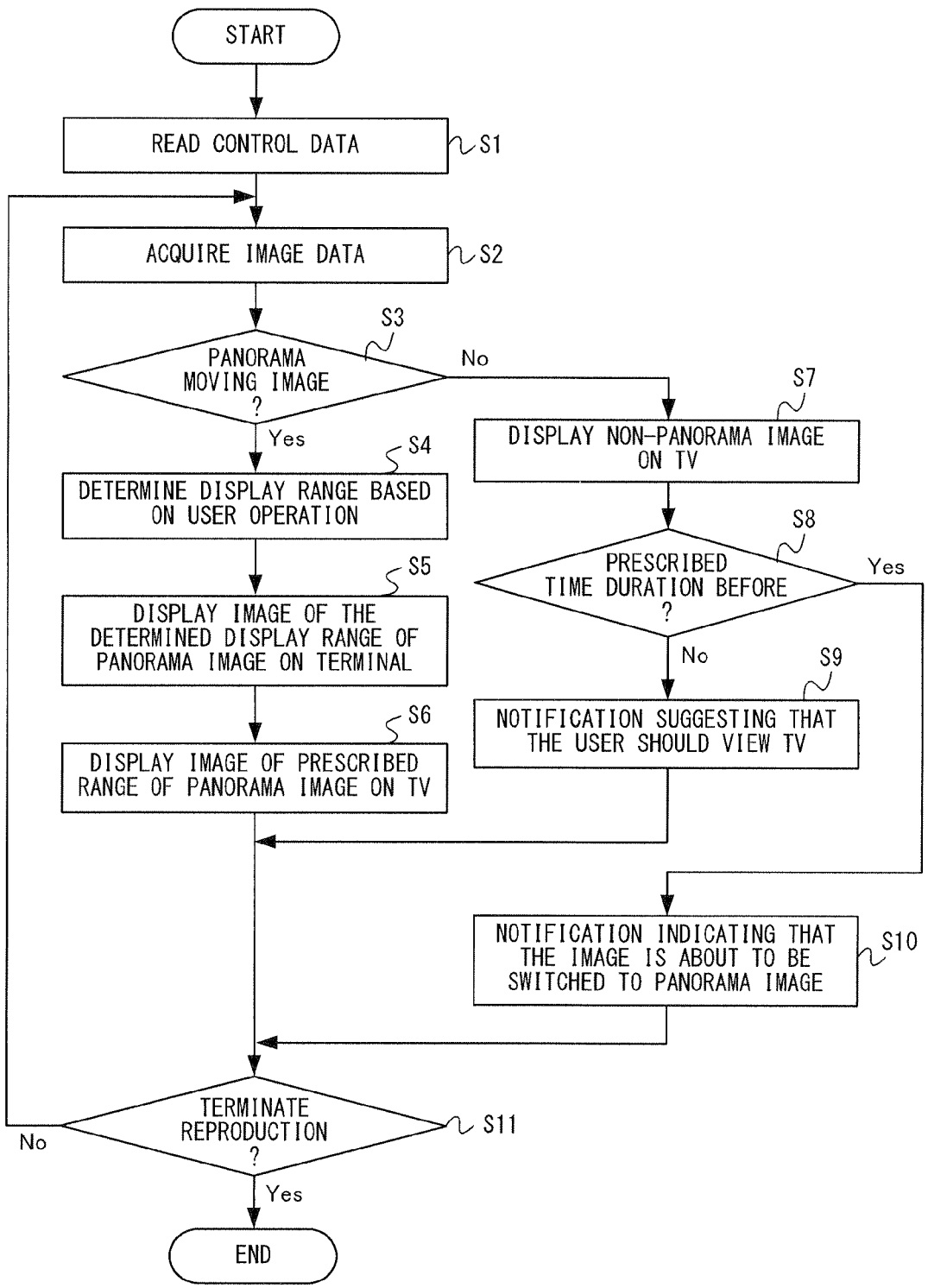
FIG. 10 is a flowchart showing an example of flow of a moving image reproduction process executed by the information processing device in the example embodiment.

Hereinafter, a specific example of moving image reproduction process executed by the information processing system 1 (information processing device 2) in the example embodiment will be described. FIG. 10 is a flowchart showing an example of flow of the moving image reproduction process executed by the information processing device 2 (control unit 11) in the example embodiment. In the example embodiment, the series of steps shown in FIG. 10 are performed by the CPU in the control unit 11 executing the moving image reproduction program 30.

The timing at which the moving image reproduction process shown in FIG. 10 is started may be any timing. In the example embodiment, the execution of the moving image reproduction program 30 is started in response to the user making an instruction to start the moving image by use of the terminal device 3. At this point, the moving image reproduction program 30 is executed by a part thereof or the entirety thereof being read to the memory in the control unit 11 at an appropriate timing. As a result, the series of steps shown in FIG. 10 are started. The moving image reproduction program 30 is stored in advance in the storage unit 12 in the information processing device 2. In another embodiment, the moving image reproduction program 30 may be acquired from a storage medium attachable/detachable to/from the information processing device 2 and stored on a memory, or may be acquired from another device via a network such as the Internet or the like and stored on the memory.

The steps in the flowchart in FIG. 10 are merely an example, and the processing order of the steps may be changed as long as substantially the same result is provided. Instead of each step (or in addition to each step), another step may be executed. In the example embodiment, the steps in the flowchart are executed by the CPU. Alternatively, a part of the steps in the flowchart may be executed by a processor other than the CPU or a dedicated circuit.

In the example embodiment, first in step S1, the CPU reads the control data 34 (type data) included in the moving image data 31 stored in the storage unit 12. In the example embodiment, the CPU uses the type data to find the type of the image in each frame in the moving image (timing to switch between the panorama moving image and the non-panorama moving image in the moving image). After step S1, a process of steps 2 through S11 is repeated to reproduce the moving image. In the example embodiment, the processing loop of steps 2 through S11 is executed once for each frame.

In step S2, the CPU acquires image data (panorama image data or non-panorama image data) corresponding to the current frame. Namely, the CPU reads, from the storage unit 12, the image data corresponding to the current frame number from the panorama image data included in the moving image data 31 (the current frame number corresponds to the number of times by which the processing loop of steps S2 through S11 has been executed). The read image data is stored on the memory in the control unit 11 (when being compressed, the image data is decompressed before being stored).

In step S3, the CPU determines whether the moving image to be reproduced in the current frame is the panorama moving image or not. This determination is made by use of the type of the image found in step S1. When the result of the determination in step S3 is positive, the process of step S4 is executed. By contrast, when the result of the determination in step S3 is negative, the process of step S7 described later is executed.

In step S4, the CPU determines the display range of the panorama image based on an operation made by the user. The display range may be determined by any specific method. For example, the display range is determined by the method described in the "Reproduction of panorama moving image" above.

In step S5, the CPU has the terminal device 3 display an image of the determined display range. Namely, the CPU extracts the image of the display range from the panorama image represented by the panorama image data acquired in step S2, and transmits the extracted image to the terminal device 3. The terminal device 3 displays the image, transmitted from the information processing device 2, on the LCD 21. Owing to this, the image of the display range is displayed on the terminal device 3.

In step S6, the CPU has the TV 4 display an image of a prescribed range. Namely, the CPU extracts the image of the prescribed range from the panorama image represented by the panorama image data acquired in step S2, and transmits the extracted image to the TV 4. The prescribed range may be determined by any specific method. For example, the prescribed range is determined by the method described in the "Reproduction of panorama moving image" above. The TV 4 displays the image transmitted from the information processing device 2. Owing to this, the image of the prescribed range is displayed on TV 4. After step S6, the process of step S11 described later is executed.

In step S7, the CPU has the TV 4 display the non-panorama image. Namely, the CPU transmits the non-panorama image, represented by the non-panorama image data acquired in step S2, to the TV 4. Owing to this, the non-panorama moving image is displayed on the TV 4.

In step S8, the CPU determines whether or not a time point which is a prescribed time before the timing at which the non-panorama moving image is to be switched to the panorama moving image has come. This determination is made by use of the type of the image found in step S1. A specific method for determination is, for example, the method described in "Transition from non-panorama moving image to panorama moving image" above. When the result of determination in step S8 is negative, the process of step S9 described later is executed. By contrast, when the result of determination in step S8 is positive, the process of step S10 described later is executed.

In step S9, the CPU provides a notification which suggests that the user should view the TV 4. Namely, as described in "Reproduction of non-panorama moving image" above, the CPU outputs an image including the notification image 51 to the terminal device 3. Owing to this, the image including the notification image 51 is displayed on the terminal device 3 (see FIG. 7). After step S9, the process of step S11 described later is executed.

In step S10, the CPU provides a notification that indicates that the non-panorama moving image is to be switched to the panorama moving image. Namely, as described in "Transition from non-panorama moving image to panorama moving image" above, the CPU provides the notification which indicates that the non-panorama moving image is to be switched to the panorama moving image, by use of an image and a sound. According to this, the notification images 52 and 53 representing the notification are displayed on the LCD 21 of the terminal device 3, and a sound representing the notification is output from the speaker 22 of the terminal device 3. After step S10, the process of step S11 described later is executed.

In step S11, the CPU determines whether or not to terminate the reproduction of the moving image. This determination may be made by any specific method. For example, when the moving image is reproduced until the end, or when the user makes an instruction to terminate the reproduction of the moving image, the CPU determines to terminate the reproduction of the moving image. For example, during the reproduction of the moving image or when the user has not made an instruction to terminate the reproduction of the moving image, the CPU determines not to terminate the reproduction of the moving image. When the result of determination in step S11 is negative, the process of step S2 is executed again. After this, the process of steps S2 through S11 is repeated until the CPU determines to terminate the reproduction of the moving image in step S11. By contrast, when the result of determination in step S11 is positive, the CPU terminates the process of reproducing the moving image shown in FIG. 10.

By the moving image reproduction process described above, the information processing device 2 executes the reproduction of the moving image including the panorama moving image and the non-panorama moving image. Namely, the information processing device 2 acquires the moving image data by the process of step S2, and reproduces the panorama moving image and the non-panorama moving image in the order defined by the moving image data by the process of steps S4 through S7.

6. Modification

In the example embodiment, the information processing system 1 includes two display devices. In another embodiment, the information processing system 1 may include only one display device or three or more display devices. In the case where there is one display device, during the reproduction time duration of the panorama moving image, the display range may be changed (e.g., in accordance with an operation made by the user), so that a part of the panorama image is displayed on the display device; whereas during the reproduction time duration of the non-panorama moving image, substantially the entirety of the non-panorama image may be displayed on the display device.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the above-described embodiments are usable as, for example, an information processing device, a moving image reproduction program or moving image data for reproducing a moving image for the purpose of, for example, reproducing the moving image in a wider variety of forms.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing device for displaying a moving image on at least one display device, the information processing device comprising a computer configured to perform at least:

moving image acquisition for acquiring moving image data which includes at least one piece of data of panorama moving image including panorama images each representing an image of a range wider than the range displayed on the display device and also includes at least one piece of data of non-panorama moving image including non-panorama images, each representing an image of a range substantially the same as the range displayed on the display device; and moving image reproduction for reproducing the at least one piece of data of panorama moving image and the at least one piece of data of non-panorama moving image in an order defined by the moving image data during a time duration from a start to an end of the moving image, wherein the moving image reproduction switches between displaying a first image which is a panorama image and displaying a second image which is a non-panorama image, by displaying the non-panorama second image after a time duration in which the panorama first image is displayed, and/or starts displaying the panorama first image after a time duration in which the non-panorama second image is displayed, wherein a series of images including panorama images and non-panorama images are displayed one after another in a predetermined order, thereby reproducing a panorama moving image and a non-panorama moving image by switching from one to another, wherein:

the information processing device is capable of displaying the moving image on a first display device and a second display device; and the moving image reproduction includes:

panorama reproduction, for reproducing the panorama moving image during the time duration, displaying a moving image of a prescribed range of the panorama moving image on the first display device, and displaying a moving image, of a range changed by an operation made by a user, of the panorama moving image on the second display device; and non-panorama reproduction, for reproducing the non-panorama moving image during the time duration, displaying the non-panorama moving image on the first display device.

2. The information processing device according to claim 1, wherein for reproducing the non-panorama moving image during the time duration, the non-panorama reproduction displays, on the second display device, an image notifying a suggestion that the first display device should be viewed.

3. The information processing device according to claim 1, wherein when the reproduction of the non-panorama second image is to be switched to the reproduction of the panorama first image during the time duration, the non-panorama reproduction makes a notification by an image and/or a sound by use of the second display unit before the reproduction of the non-panorama second image is switched to the reproduction of the panorama first image.

4. The information processing device according to claim 1, wherein:

the moving image data includes type data by which it is distinguished whether an image in each of frames during the time duration from the start to the end of the moving image is a panorama image or a non-panorama image; and the moving image reproduction distinguishes, based on the type data, whether an image in each of the frames is a panorama image or a non-panorama image, and reproduces the moving image by a reproduction processes which is different in accordance with the distinguishing result.

5. The information processing device according to claim 4, wherein when the image of a certain frame during the time duration is distinguished as the panorama image, the moving image reproduction selects, as a display target, an image, of a range determined by an operation made by the user, of the panorama image for the certain frame; and when the image of a certain frame during the time duration is distinguished as the non-panorama image, the moving image reproduction selects, as a display target, the range of the non-panorama image for the certain frame.

6. A computer-readable non-transitory storage medium having stored thereon moving image data usable for reproducing a moving image on a display device, wherein:

the moving image data includes:

at least one piece of data of panorama moving image including panorama images, each representing an image of a range wider than the range displayed on the display device; and at least one piece of data of non-panorama moving image including non-panorama images, each representing an image of a range substantially the same as the range displayed on the display device; and the moving image data is structured such that the at least one piece of data of panorama moving image and the at least one piece of data of non-panorama moving image are reproduced in an order defined by the moving image data during a time duration from a start to an end of the moving image, wherein the moving image reproduction switches between displaying a first image which is a panorama image and displaying a second image which is a non-panorama image, such that the non-panorama second image starts being displayed after a time duration in which the panorama first image is displayed, and/or the panorama first image starts being displayed after a time duration in which the non-panorama second image is displayed, wherein a series of images including panorama images and non-panorama images are displayed one after another in a predetermined order, thereby reproducing a panorama moving image and a non-panorama moving image by switching from one to another, wherein:

the moving image is displayed on a first display device and a second display device; and the moving image reproduction includes:

panorama reproduction, for reproducing the panorama moving image during the time duration, displaying a moving image of a prescribed range of the panorama moving image on the first display device, and displaying a moving image, of a range changed by an operation made by a user, of the panorama moving image on the second display device; and non-panorama reproduction, for reproducing the non-panorama moving image during the time duration, displaying the non-panorama moving image on the first display device.

7. The computer-readable non-transitory storage medium according to claim 6, wherein the moving image data further includes type data by which it is distinguished whether an image in each of frames during the time duration from the start to the end of the moving image is a panorama image or a non-panorama image.

8. The computer-readable non-transitory storage medium according to claim 6, wherein:
data of the panorama moving image of one frame and data of the non-panorama moving image of one frame each represent an image area of a prescribed size;
the data of the panorama moving image represents a panorama image by use of a part of the image area of the prescribed size; and
the data of the non-panorama moving image represents a non-panorama image by use of a part of the image area of the prescribed size.

9. The computer-readable non-transitory storage medium according to claim 6, wherein:
the data of the panorama moving image and the data of the non-panorama moving image are compressed by a prescribed method; and
the compressed data of the non-panorama moving image of one frame is structured to have a smaller data amount than that of the compressed data of the panorama moving image of one frame.

10. The computer-readable non-transitory storage medium according to claim 6, wherein
the non-panorama image has a higher resolution that that of the panorama image.

11. The computer-readable non-transitory storage medium according to claim 6, wherein
the data of the panorama moving image and the data of the non-panorama moving image are included in one data file.

12. The computer-readable non-transitory storage medium according to claim 7, wherein
the data of the panorama moving image, the data of the non-panorama moving image, and the type data are included in one data file.

13. The computer-readable non-transitory storage medium according to claim 6, wherein
a visual field of the non-panorama moving image corresponds to a part of a visual field of the panorama moving image.

14. An information processing system for displaying a moving image on at least one display device, the information processing system comprising a computer configured to perform at least:
moving image acquisition for acquiring moving image data which includes at least one piece of data of panorama moving image including panorama images each representing an image of a range wider than the range displayed on the display device and also includes at least one piece of data of non-panorama moving image including non-panorama images each representing an image of a range substantially the same as the range displayed on the display device; and
moving image reproduction for reproducing the at least one piece of data of panorama moving image and the at least one piece of data of non-panorama moving image in an order defined by the moving image data during a time duration from a start to an end of the moving image, wherein
the moving image reproduction switches between displaying a first image which is a panorama image and displaying a second image which is a non-panorama image, by displaying the non-panorama second image after a time duration in which the panorama first image is displayed, and/or starts displaying the panorama first image after a time duration in which the non-panorama second image is displayed, wherein
a series of images including panorama images and non-panorama images are displayed one after another in a predetermined order, thereby reproducing a panorama moving image and a non-panorama moving image by switching from one to another, wherein:
the moving image is displayed on a first display device and a second display device; and
the moving image reproduction includes:
panorama reproduction, for reproducing the panorama moving image during the time duration, displaying a moving image of a prescribed range of the panorama moving image on the first display device, and displaying a moving image, of a range changed by an operation made by a user, of the panorama moving image on the second display device; and
non-panorama reproduction, for reproducing the non-panorama moving image during the time duration, displaying the non-panorama moving image on the first display device.

15. A computer-readable non-transitory storage medium having stored thereon a moving image reproduction program executable by a computer of an information processing device for displaying a moving image on at least one display device, wherein the moving image reproduction program allows the computer to execute:
acquiring moving image data which includes at least piece of data of one panorama moving image including panorama images each representing an image of a range wider than the range displayed on the display device and also includes at least one piece of data of non-panorama moving image including non-panorama images each representing an image of a range substantially the same as the range displayed on the display device; and
reproducing the at least one piece of data of panorama moving image and the at least one piece of data of non-panorama moving image in an order defined by the moving image data during a time duration from a start to an end of the moving image, wherein
the moving image reproduction switches between displaying a first image which is a panorama image and displaying a second image which is a non-panorama image, such that the non-panorama second image starts being displayed after a time duration in which the panorama first image is displayed, and/or the panorama first image starts being displayed after a time duration in which the non-panorama second image is displayed, wherein
a series of images including panorama images and non-panorama images are displayed one after another in a predetermined order, thereby reproducing a panorama moving image and a non-panorama moving image by switching from one to another, wherein:
the information processing device is capable of displaying the moving image on a first display device and a second display device; and
the moving image reproduction includes:
panorama reproduction, for reproducing the panorama moving image during the time duration, displaying a moving image of a prescribed range of the panorama moving image on the first display device, and displaying a moving image, of a range changed by an operation made by a user, of the panorama moving image on the second display device; and non-panorama reproduction, for reproducing the non-panorama moving image during the time duration, displaying the non-panorama moving image on the first display device.

16. A moving image reproduction method for reproducing a moving image by use of at least one display device, the moving image reproduction method comprising:
   acquiring moving image data which includes at least piece of data of one panorama moving image including panorama images each representing an image of a range wider than the range displayed on the display device and also includes at least one piece of data of non-panorama moving image including non-panorama images each representing an image of a range substantially the same as the range displayed on the display device; and
   reproducing the at least one piece of data of panorama moving image and the at least one piece of data of non-panorama moving image in an order defined by the moving image data during a time duration from a start to an end of the moving image, wherein
   the moving image reproduction switches between displaying a first image which is a panorama image and displaying a second image which is a non-panorama image, such that the non-panorama second image starts being displayed after a time duration in which the panorama first image is displayed, and/or the panorama first image starts being displayed after a time duration in which the non-panorama second image is displayed, wherein
   a series of images including panorama images and non-panorama images are displayed one after another in a predetermined order, thereby reproducing a panorama moving image and a non-panorama moving image by switching from one to another, wherein:
   the moving image is displayed on a first display device and a second display device; and
   the moving image reproduction includes:
   panorama reproduction, for reproducing the panorama moving image during the time duration, displaying a moving image of a prescribed range of the panorama moving image on the first display device, and displaying a moving image, of a range changed by an operation made by a user, of the panorama moving image on the second display device; and
   non-panorama reproduction, for reproducing the non-panorama moving image during the time duration, displaying the non-panorama moving image on the first display device.

17. The information processing device according to claim 1, wherein
   the first display device is different from the second display device.

18. The information processing device according to claim 14, wherein
   the at least one display device comprises a first display device and a second display device which is different from the first display device.

19. The computer-readable non-transitory storage medium according to claim 15, wherein
   the at least one display device comprises a first display device and a second display device which is different from the first display device.

20. The moving image reproduction method according to claim 16, wherein
   the at least one display device comprises a first display device and a second display device which is different from the first display device.

* * * * *